Figure 1:
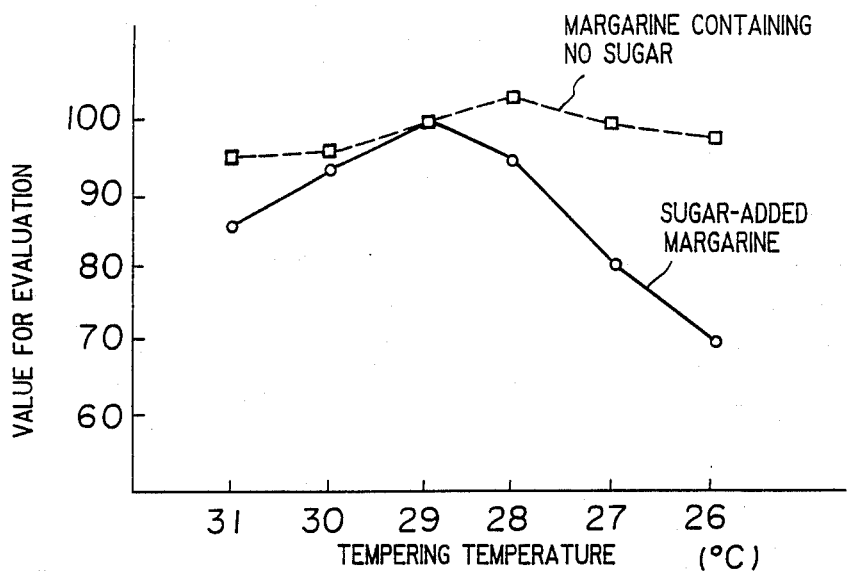

United States Patent [19]

Sasaki et al.

[11] Patent Number: 4,828,855

[45] Date of Patent: May 9, 1989

[54] METHOD FOR PRODUCING SUGAR-ADDED MARGARINE

[75] Inventors: Hirohisa Sasaki, Iwakura; Takeo Saotome, Kobe; Moriya Sano, Kobe; Kouichiro Marusugi, Kobe; Hiroaki Hoshino, Kobe; Yoshibumi Minowa; Tetsuo Moriguchi, both of Amagasaki, all of Japan

[73] Assignee: Mitsubishi Denki Kabushiki Kaisha, Tokyo, Japan

[21] Appl. No.: 51,770

[22] Filed: May 20, 1987

[30] Foreign Application Priority Data

May 21, 1986 [JP] Japan ................................ 61-116641

[51] Int. Cl.4 ............................................. A23D 3/00
[52] U.S. Cl. .................................... 426/241; 426/603; 426/658
[58] Field of Search ............... 426/603, 602, 241, 658, 426/607

[56] References Cited

U.S. PATENT DOCUMENTS 3,117,011  1/1964  Hoerr et al. .......................... 426/417
3,469,996  2/1966  Endres et al. ........................ 426/241

FOREIGN PATENT DOCUMENTS 0032808   7/1981  European Pat. Off. ............ 426/603
151759   12/1977  Japan .
6842      1/1984  Japan .
80499     5/1984  Japan .

Primary Examiner—Donald E. Czaja
Assistant Examiner—Celine T. Callahan
Attorney, Agent, or Firm—Oblon, Fisher, Spivak, McClelland & Maier

[57] ABSTRACT

A method of manufacturing sugar-added margarine containing 5 to 50% by weight of sugar calculated in terms of its anhydride, characterized in that, an emulsion of oil and fat, and sugar is uniformly heated by means of a micro-wave heating device at a pre-established optimum tempering temperature which is higher than a temperature lower by 10° C. than the increased melting point of the oil and fat with a precision of ±2.0° C., and then the heated emulsion is cooled at a rate of not higher than 5° C./hr.

12 Claims, 1 Drawing Sheet

METHOD FOR PRODUCING SUGAR-ADDED MARGARINE

This invention relates to a method for producing sugar-added margarine, and, more particularly, it is concerned with a method for producing such margarine that possesses excellent foaming property and stability when it is used at a dining table or for confection and bread-baking.

Conventional margarine and shortening, after emulsification of oil and fat as the starting material, followed by quenching and kneading the same, are subjected to tempering for a time period of from 24 to 72 hours at a temperature lower by approximately 5° to 10° C. than a melting point of the oil and fat used, thereby changing their crystallinity from an unstable type to a stable one so as to attain stabilization of the product. It is also a usual practice to carry out tempering (or ripening) to obtain margarine and shortening which are excellent in their creaming and whipping properties to be suitable for confection and bread-baking (vide: for example, "MARGARINE" by A. J. C. Anderson, pp 209–216, 1954). However, since the conventional tempering (or ripening) requires a considerably long period of time, there has been proposed a method for carrying out the tempering in a short period of time wherein the materials for margarine and shortening are heated by means of micro-waves. U.S. Pat. No. 3,469,996 discloses a method, in which the micro-waves are utilized for tempering of the shortening, by which the tempering can be carried out in a short period of time. Other methods wherein the micro-waves are utlized in the tempering of margarine and shortening are known from Japanese Unexamined Patent Publication Nos. 151759/1977, 6841/1984, 6842/1984, 41396/1984 and 80499/1984.

It has so far been known that, for these shortening and margarine in general to be used in their whipped state, excellent whipping property can be obtained by placing them in a tempering chamber and carrying out such tempering in a time period of from 24 to 72 hours. This method, however, still has problems such that it requires a long period of time for the tempering, that it requires a large space for the tempering chamber as an installation, that it can not be adapted for continuous treatment, and so forth.

In order to cope with these problems, it has been attempted to use micro-wave irradiation for reduction in the tempering time and in the size of the tempering chamber. However, even this micro-wave irradiation has a problem such that, since dielectric constants of components such as oil and fat, water, and so on are different, partial temperature rise in these materials takes place, whereby it is difficult to attain uniform heating of the material. As the methods and apparatus for solving such problems, the above-mentioned U.S. Pat. No. 3,469,996, Japanese Unexamined Patent Publication No. 151759/1977 and four others were devised.

The above-mentioned methods disclosed in these patent and patent applications are all directed to the tempering of ordinary margarine and shortening to which no sugar is added. For preparing whipped cream, the margarine for confection is whipped after addition of sugar thereto. By the addition of sugar at the time of production of margarine, it can be used directly and favorably as the margarine for the whipped cream without necessity for the post-addition of sugar. Also, such sugar-added margarine can be utilized as a sugar-added spread, because of its sweet taste.

In the step of tempering such sugar-added margarine, it is heated at a temperature which is lower by 5° to 10° C. than the melting point of the oil and fat constituting the margarine, as the optimum heating temperature for the tempering, and thereafter it is cooled in a cold air chamber or at room temperature for a time period of from 30 to 48 hours, as is the case with the conventional tempering chamber method. However, since the sugar-added margarine contains sugars, and the content of oil and fat is corresponding lower, it is difficult to obtain stabilized crystallinity, even when it is subjected to the tempering under the same conditions as in the tempering of ordinary margarine. When the tempering is conducted at the optimum tempering temperature for the sugar-added margarine, there is no change in the overrun at the time of the whipping or the time period for the whipping. The sugar-added margarine, however, has its disadvantage such that, since a range of its optimum tempering temperature is very narrow and fluctuation in temperature is large in the tempering according to the conventional method, the whipping performance of the margarine is not constant. In order to obtain high and constant whipping property, a temperature deviation from the optimum tempering temperature is required to be kept within ±2° C.. To satisfy this requirement, the conventional method requires a tempering time of 30 hours or longer. Further, with a view to keeping the temperature deviation within ±1.5° C., the conventional method requires a tempering time of 48 hours or longer.

The results of various studies and researches for solving the above-mentioned problems have arrived at the present invention.

Namely, the present invention provides a method for manufacturing sugar-added margarine containing 5 to 50% by weight of sugar calculated in terms of its anhydride, characterized in that, an emulsion of oil and fat, and sugar is uniformly heated by means of a micro-wave heater at a pre-established tempering temperature which is higher than a temperature lower by 10° C. than the increased melting point of the oil and fat with a precision of ±2.0° C., and then the heated emulsion is cooled at a rate of not higher than 5° C./hr.

By thus controlling the tempering temperature with good precision and also controlling the cooling rate, the sugar-added margarine with excellent whipping property can be obtained.

The present invention will be described in detail with reference to the accompanying drawings which illustrate various specific embodiments.

FIG. 1 is a graphical representation showing a correlation between the values for evaluating the tempering and the temperature (°C.) for the tempering in the sugar-added margarine of the present invention and ordinary margarine (without sugar).

The margarine of the present invention contains, in its total composition, sugar in an amount of from 5 to 50% by weight, preferably from 10 to 35% by weight, calculated in terms of its anhydride. Examples of the sugar to be used in this invention include cane sugar, glucose, fructose, lactose, maltose, starch sugar, molasses, syrup, malt reducing sugar and isomerized sugar. Two or more kinds of these sugars in their anhydride from and/or hydrated form may be mixed for use. If the quantity of the sugar is less than 5% by weight, no adequate sweetness can be obtained, and the precision in its tempering temperature may not be different from that in the treatment of the conventional margarine containing no sugar. On the other hand, if the quantity exceeds 50% by weight, there will be various problems such that the sweetness becomes excessive, and the sugar contained becomes crystallized to cause roughness to the feel in the mouth, and, when the margarine is hydrated to such an extent that the crystallized sugar may be dissolved, it is no longer margarine.

Examples of the oil and fat to be used for producing the margarine include refined animal and vegetable oils and their hardened oils and fats as well as their fractional oils and fats, and further transesterified oils of these. At least one kind selected from these oils and fats may be used. Examples of the animal and vegetable oils and fats include rape seed oil, corn (kernel) oil, soy bean oil, palm (kernel) oil, cotton seed oil, coconut oil, safflower oil, milk fat, beef tallow and lard. The hardened oils are those of the above-mentioned liquid vegetable oils and fish oil as well. It is more preferable that one or more kinds of hardened oil and/or coconut oil be blended. The quantity of the oil and fat may preferably be in a range of from 30 to 90% by weight with respect to the total composition.

As the emulsifier to be used for manufacturing the sugar-added margarine according to the present invention, there may be enumerated lecithin, sorbitan fatty acid ester, cane sugar fatty acid ester, glycerine fatty acid ester, propylene glycol fatty acid ester, polyglycerine fatty acid ester, and so on. Two or more kinds of these emulsifiers may be mixed for use. It is preferable to use an emulsifier having high hydrophilic property. More preferably, the kind and quantity of such emulsifier may be selected so that the value of HLB is 8 or above. Polyglycerine fatty acid ester, and the like are the most suited for this purpose. The quantity of the emulsifier ranges from 0.1 to 5% relative to the oil and fat used. The water content in the batch for manufacturing the margarine according to the present invention may be in a range of from 3 to 65% by weight, or preferably from 15 to 25% by weight based on the total composition. Into this water, there are dissolved sugar and, depending on necessity, sodium chloride, rubbery substance, and others so as to be used as an aqueous phase. Besides these, there may also be added appropriate quantities of coloring matters, flavors, carbohydrates, proteins, and so forth.

Now, explanations will be made as to the method for manufacturing the sugar-added margarine according to the present invention. First of all, a predetermined quantity of oil is placed in an emulsifying vessel for production of margarine. Depending on necessity, an emulsifier may preliminarily be dissolved or dispersed in the oil. The temperature for the treatment is desirably maintained at a level higher than the melting point of the oil and fat. More preferably, it is kept in a range of from 55° to 65° C. The emulsifier may also be added directly into the emulsifying vessel, to which there is added for emulsification a predetermined quantity of an aqueous phase prepared by dissolving or dispersing sugar and other materials into water. The temperature of the aqueous phase is desirably higher than the melting point of the oil and fat used. For the dual purpose of tempering and sterilitation, however, it is preferable that the aqueous phase is heated to 80° C. or above, and thereafter lowered to a level of from about 55° to 65° C. As the case requires the emulsifier may preliminarily be dissolved or dispersed in the aqueous phase. When there are used materials other than oil and fat, water, sugars, and emulsifier, they may preliminarily be dissolved in oil, depending on necessity if these materials are oleophilic. When these materials are in liquid form, they may be placed directly into the emulsifying vessel, as the case requires. Further depending on necessity, the batch of the materials may be homogenized by means of a homogenizer, homo-mixer, line mixer, colloid mill, or other devices. After the uniform emulsification, the batch is quenched and kneaded by means of portater, combinater, complecter, perfecter and so forth, thereby obtaining plasticized solid fat. The plasticized solid fat thus obtained is then subjected to heat-treatment by a micro-wave heating device disposed at any one locations, i.e., in the transporting pipe; after it is packed in a package; or during its packaging. As the micro-wave heating device, there may be used an industrial microwave heating device, etc. having a frequency of 2,450 MHz. For the purpose of this heat treatment, a heating condition is established in such a manner that the temperature deviation may be within a range of ±2.0° C. with respect to the optimum tempering temperature. The optimum tempering temperature is determined by preliminarily measuring the increased melting point of the oil and fat, or of the mixture of oils and fats and, calculation by the SFC approximation method. The method for the determination is as follows. The solid fat content of one kind of oil and fat, or a mixture of two or more kinds of the oils and fats is measured by the SFC approximation method at each of the temperature levels of 10° C., 20° C., 30° C., 35° C. and 40° C. Then, SFC curves are plotted on the basis of the values obtained as well as the melting point of the oil and fat or the increased melting point of the mixture of the oils and fats. From the thus plotted graph, a temperature will be found, at which the solid fat content takes a value ranging from 6 to 8, and the thus found temperature is made the optimum tempering temperature.

The SFC method is a method for measuring the solid fat content by use of a solid fat content analyzer "PRAXIS MODEL SFC-900" manufactured and sold by PRAXIS, Inc., U.S.A., the method having been recognized by A.O.C.S.

After heating, the batch is subjected to cooling treatment at one or more locations, i.e., in the production line, after packaging, and during packaging. The rate of cooling from the tempering temperature is 5° C./hr., or preferably 3° C./hr. It is, however, preferable that, within a range of 10° C. or below from the established tempering temperature, the cooling rate should be 5° C./hr. The final product may usually be obtained by cooling the batch to 10° C. or below in a time period of from 24 to 48 hours.

According to the present invention, from the results of studies and researches conducted by the present inventors over many years on improvement in the whipping property of margarine through its tempering, it has been found that the whipping property of margarine varies depending on the composition of the solid fat and the margarine containing such solid fat in accordance with a definite rule. From studies and analyses of this finding, a value which is called "a value for evaluating tempering" has been established, with which it has further been found that the value denotes a particular property of the sugar-added margarine. This "value for evaluating tempering" is obtained from the following equation.

$$\text{Value for evaluating tempering} = \left(1 - \frac{Gt - Gs}{Gs}\right) \times 100$$

(where: Gs is a standard specific gravity based on the rule of thumb; and Gt denotes a specific gravity at the time of over-running of the sample)

As mentioned above, Gs is the standard specific gravity based on the rule of thumb, which may be found from the following equation:

$$Gs = \rho s \times 0.3$$

(where: $\rho s$ is the specific gravity of margarine before its whipping)

Further, the value Gt is obtained in the following manner. That is to say, a sample which has been subjected to the tempering process at a certain temperature is maintained at a temperature of 10° C., and then whipped by use of a wire whipper in a vertical mixer with five-coated layer; specific gravity of the sample is repeatedly measured at every five minutes; as the whipping progresses, the specific gravity of the sample becomes lowered, but, on the march of a certain time instant, it assumes an increased value or a constant value. The specific gravity of the sample at this time is determined at Gt.

The practical range of the value for evaluating tempering of margarine is 80 or above; on the contrary, when the value is 60 or below, the margarine is not practically usable.

FIG. 1 indicates a relationship between the value for evaluation tempering obtained in the above-mentioned manner and the tempering temperature, which was obtained from measurement of the conventional margarine (containing no sugars) and the sugar-added margarine according to the present invention (Measurement Example 1). As it may be understood from this graphical representation, the sugar-added margarine of the present invention has a very narrow range of the optimum temperature in the course of its tempering in comparison with that of the conventional margarine, hence it requires a very precise temperature control.

However, even when the margarine is tempered at the optimum temperature, if no attention is paid to the cooling of the margarine after its tempering, it is not able to exhibit its whipping property to the fullest extent.

Figure 2:
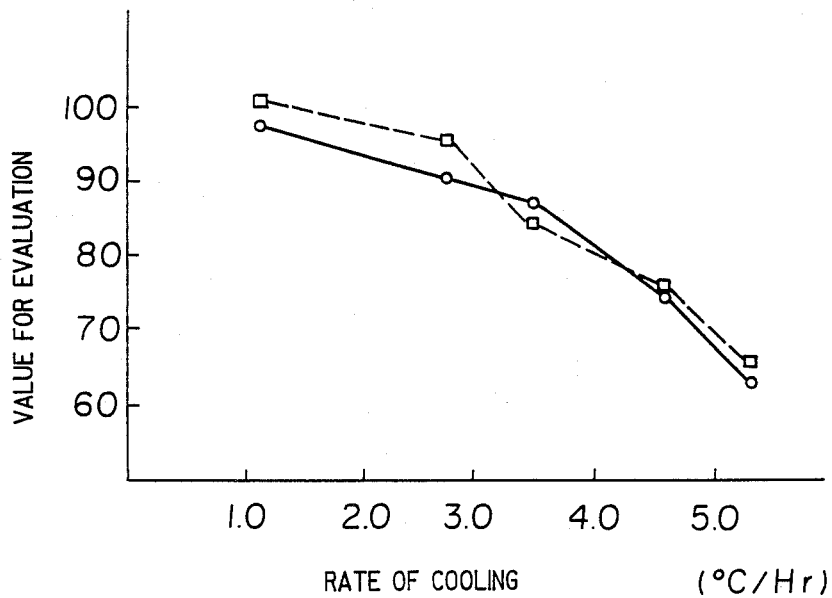

FIG. 2 indicates curves (Measurement Example 2) of the margarines which have been tempered to the optimum value for evaluating the tempering as shown in FIG. 1, when the cooling rate of the same after the tempering has been varied. From these curves, it will be seen that the value for evaluating the tempering remarkably decreases on both conventional margarine and sugar-added margarine of the present invention according as the rate of cooling becomes high. That is to say, the lower the rate of cooling is, the better. It may therefore be seen that, in order to obtain a high value for evaluating the tempering, the rate of cooling of 5° C./hr. or lower, or preferably 3° C./hr. or lower, gives the favorable cooling conditions. From the above-mentioned result, it may be concluded that, in the production of the sugar-added margarine, the precise and accurate temperature control is necessary for the optimum tempering, and, at the same time, the subsequent cooling of the margarine should be done with the utmost care and at the moderate cooling rate. For this purpose, the micro-wave heating device is used as the heater, whereby it becomes possible to accurately and quickly heat the product to its established temperature with tolerance of ±1° C. or narrower, and also to attain reduction in the treatment time as well as stability of the resulting product.

MEASUREMENT EXAMPLE 1

As an oil phase, hardened fish oil (having melting point of 34° C.), palm oil, and soy bean oil were mixed at a ratio of 7:2:1. To this mixture, then, 0.1% by weight of lecithin and 0.2% by weight of distilled monoglyceride having HLB of 4.3 were added and dissolved. The melting point of the oil phase at this time was 32.1° C. and its optimum tempering temperature by the SFC approximation method was 29° C.

As an aqueous phase, there were prepared the following two kinds: (A) an aqueous solution composed of 17 kg of water, 20 kg of cane sugar, and 1 kg of defatted milk powder; and (B) an aqueous solution composed of 17 kg of water and 1 kg of defatted milk powder. Each of these two kinds of aqueous solution was heated to a temperature of 80° C., after which it was maintained at a temperature of 60° C. to prepare the aqueous phase. Then, 62 kg of the previously prepared oil phase and 38 kg of the aqueous phase (A), and 82 kg of the oil phase and 18 kg of the aqueous phase (B) were individually emulsified by addition of the aqueous phase to the oil phase to prepare sugar-added margarine and margarine without sugar through the portater. The product was subjected to the tempering by means of a micro-wave heating device, which was installed at a location between the portater and a take-out port for the product, at the established temperature levels of 31° C., 30° C., 29° C., 28° C., 27° C. and 26° C., respectively. The tempering temperature was measured by a thermo-couple installed at a location of the take-out port for the product and in the transporting pipe. The temperature deviation at this time was within a range of ±0.6° C. or narrower from the established value. The product was filled and sealed in a plastic bag which had been put in a corrugated fiberboard container having a length of 15 cm on each side. Twelve samples thus obtained were immediately transferred into an isothermal vessel at 10° C., at which time the rate of cooling was verified to be 5° C./hr or below. The maximum rate of cooling was observed with the samples which have been tempered at 31° C., at which time the rate of cooling was 1.2° C./hr. For verification of the cooling rate, use was made of a device, in which a Cu-constantan thermocouple was connected to a chopper bar type recorder. After verification of the sample having reached 10° C., it was whipped by use of a wire whipper in a vertical type mixer with five-coated layers. FIG. 1 shows the tempering evaluation curves which were obtained from the results. From this graphical representation, it can be seen that, while the ordinary margarine has substantially constant values for evaluation of the tempering within the above-mentioned range of the tempering temperature, the values for evaluating the tempering of the sugar-added margarine change to a large extent. The permissible range of such change is ±2.0° C. of the optimum tempering temperature.

MEASUREMENT EXAMPLE 2

For the purpose of measurement, use was made of the same mixture of the oil and fat and the emulsifier, and the same mixture of the aqueous phase as in Example 1. After preparation of margarine using these mixtures, it was heated at a temperature of 29° C. by means of a micro-wave heating device installed within a transporting pipe spanning over from the portater to the take-out port for the product. The margarine thus heated was then sampled in a packaging style adapted to be put in a plastic bag which was placed in a corrugated fiberboard container having a length of 10 cm on each side. At this time, the temperature deviation was measured to verify that it was within ±1° C. of the established temperature. The samples were then cooled in isothermal vessels at temperatures of 0° C., 5° C., 10° C., 15° C. and 20° C., respectively. The rate of cooling at this time was measured in the same manner as in Measurement Example 1, and the results were 5.3° C./hr., 4.6° C./hr., 3.5° C./hr., 2.7° C./hr. and 1.1° C./hr., respectively. These samples were left to cool in air for 24 hours, and then transferred into an isothermal vessel of 10° C. to adjust the temperature. After verification of the samples having reached 10° C., they were whipped in the same manner as in Measurement Example 1. Then, the value for evaluating the tempering was obtained on the basis of a specific gravity of ten samples whipped cream. FIG. 2 illustrates a relationship between the value for evaluating the tempering and the rate of cooling. As is apparent from this graphical representation, even when the values for evaluating the tempering of each sample might be equal, such value would remarkably decrease, as the rate of cooling thereafter becomes higher with the consequence that no satisfactory results in their use could be obtained even at the cooling rate of approximately 3° C./hr., hence the rate of cooling of 5° C./hr. is almost the upper limit.

With a view to enabling those persons skilled in the art to put the present invention into practice, the following preferred examples are presented.

EXAMPLE 1

As an oil phase, hardened fish oil (with the melting point of 34° C.), palm oil, and soy bean oil were mixed at a ratio of 7:2:1. To this mixture, there were added and dissolved 0.1% by weight of lecithin and 0.2% by weight of distilled monoglyceride having a value of HLB of 4.3. At this time, the oil phase had its melting point of 33.7° C., and its optimum tempering temperature obtained by SFC approximation method was 32° C.

For the aqueous phase, 20 kg of cane sugar and 1 kg of defatted milk powder were added and dissolved into 17 kg of water. The mixture was then heated to a temperature of 80° C., after which it was cooled to a temperature of 60° C. to prepare an aqueous phase.

38 kg of the aqueous phase was added to 62 kg of the previously prepared oil phase for emulsification. After this, the emulsion was passed through the portater to obtain the sugar-added margarine. The margarine thus obtained was subjected to tempering by use of a microwave heating device which was installed at a location between the portater and the take-out port for the product. The tempering temperature was 32° C. The temperature of the product was measured by a thermo-couple installed at the take-out port for the product and in the transporting pipe. The temperature deviation at this time was ±0.6° C. or narrower with respect to the established value. The product was filled and sealed in plastic bag which was placed in a corrugated fiberboard carton having a length of 15 cm on each side. The sample thus obtained was immediately transferred into an isothermal vessel maintained at 10° C. The rate of cooling at this time was 1.3° C./hr. For verification of the cooling rate, use was made of a device, in which Cu-constantan thermo-couple was connected to the multi-chopper bar type recorder. After it was verified that the sample reached a temperature of 10° C., the sample was whipped by use of a wire whipper in a vertical type mixer with five-coated layers.

COMPARATIVE EXAMPLE 1

The same procedures as in Example 1 were followed in respect of the mixture of oils and fats used, the emulsifier, the aqueous phase, the method of production, and the method of tempering. The tempering temperature was set at 20° C., which is lower by 10° C. than the melting point of the oil and fat. The resulting margarine was packed in the same package style as in Example. The obtained sample was immediately transferred into an isothermal vessel maintained at 10° C. The rate of cooling at this time was 0.8° C./hr. After verification of the sample having reached 10° C., it was whipped in the same manner as in Example 1.

COMPARATIVE EXAMPLE 2

The same procedures as in Example 1 were followed in respect of the mixture of oils and fats, the emulsifier, the aqueous phase, the method of production, and the method of tempering. The tempering temperature was 32° C. The resulting margarine was packed in the same package style as in Example 1. The sample thus obtained was immediately transferred into an isothermal vessel maintained at 0° C. The rate of cooling at this time was 5.2° C./hr. When the sample reached 10° C., it was transferred to another isothermal vessel maintained at 10° C. This sample margarine was whipped in the same manner as in Example 1.

Table 1 indicates the above-mentioned results with Example 1, Comparative Example 1 and Comparative Example 2.

TABLE 1

|  | Melting point of oil & fat (°C.) | Established tempering temperature (°C.) | Difference from melting point (°C.) | Cooling rate (°C./hr) | Value for evaluating temperature |
| --- | --- | --- | --- | --- | --- |
| Example 1 | 33.7 | 32 | −1.7 | 1.3 | 97 |
| Comparative Example 1 | 33.7 | 20 | −13.7 | 0.6 | 48 |
| Comparative Example 2 | 33.7 | 32 | −1.7 | 5.2 | 59 |

As it can be seen from this Table 1, no satisfactory whipping property could be obtained with the sample margarine, whenever either one of the tempering temperature and the cooling rate after the tempering deviates from the range determined by the present invention.

EXAMPLE 2

The same procedures as in Example 1 were followed in respect of the mixture of oils and fats, the emulsifier, the aqueous phase, the method for production, the tempering method, and the tempering temperature. The resulting margarine was packed in a package style of 15 kg pack, which is generally considered as the packaging style of margarine for use in restaurant, confectionery and bakery. The sample thus obtained was immediately transferred into an isothermal chamber maintained at 10° C. At this time, the cooling rate was 0.4° C./hr. After verification of the sample having reached at 10° C., it was whipped in the same manner as in Example 1.

COMPARATIVE EXAMPLE 3

The same procedures as in Example were followed in respect of the mixture of oils and fats, the emulsifier, the aqueous phase, and the method for production. As to the packaging style of margarine, Example 2 was followed. The five packages of margarine were stacked in an isothermal chamber maintained at 34° C. and the tempering was carried out for 24 hours. As the result of measuring the temperature deviation at each stacked package, it was found that the side part of the package had 33.2° C., while the center part thereof had 28.1° C. Of these five stacked packages, the uppermost, the bottommost, and the package at the middle of the stack were taken out and respectively, uniformly mixed to obtain three samples. The temperatures of the margarine samples after the mixing were 32.2° C., 31.3° C. and 31.7° C., respectively. The samples thus obtained were immediately transferred into an 7isothermal chamber kept at 10° C. Furthermore, the packages of margarne at the second and fourth in the stack were transferred, as they were, into the isothermal chamber kept at 10° C. Upon verification of the temperature having reached 15° C., four samples were taken from the side part and the center part of the packages at the second and fourth stacks. The rate of cooling at this instant was not higher than 1.5° C./hr or below without exception. The samples of the margarine were then whipped in the same manner as in Example 1.

Besides the above-mentioned three samples taken from the uppermost, the bottommost and the intermediate stacks, and four samples taken from the second and fourth stacks of the packages in this Comparative Example 3, there was added the sample of Example 2. The measured results of these samples are shown in Table 2.

As is apparent from Table 2, the tempering according to the conventional method hardly provides a stable whipping property, even after a period of time as long as 24 hours, with the consequence that the whipping property amoung the products as well as within a single product was in a state of being considerable irregular.

EXAMPLE 3

The sugar-added margarine samples were produced in accordance with the method for production according to the present invention by adjusting the sugar content to 10%, 20% and 30%, respectively. The sugar-added margarine samples had the following compositions.

| (1) Mixture of oils and fats | |
|---|---|
| Hardened fish oil | 37.0 parts by weight |
| Palm oil | 25.0 parts by weight |
| Soy bean oil | 10.0 parts by weight |
| Distilled monoglyceride | 0.2 parts by weight |
| Lecithin | 0.1 parts by weight |
| Water | 16.68 parts by weight |
| Cane sugar | 10.0 parts by weight |
| Defatted milk powder | 1.0 parts by weight |
| β-carotene | 0.01 parts by weight |
| Flavor | 0.01 parts by weight |
| (2) Mixture of oils and fats | |
| Hardened fish oil (melting point of 36° C.) | 32.0 parts by weight |
| Palm oil | 20.0 parts by weight |
| Soy bean oil | 10.0 parts by weight |
| Distilled monoglyceride | 0.2 parts by weight |
| Lecithin | 0.1 parts by weight |
| Water | 16.68 parts by weight |
| Cane sugar | 10.0 parts by weight |
| Malt reducing sugar | 10.0 parts by weight |
| Defatted milk powder | 1.0 parts by weight |
| β-carotene | 0.01 parts by weight |
| Flavor | 0.01 parts by weight |
| (3) Mixture of oils and fats | |
| Hardened fish oil (melting point of 36° C.) | 27.0 parts by weight |
| Palm oil | 15.0 parts by weight |
| Soy bean oil | 8.0 parts by weight |
| Distilled monoglyceride | 0.2 parts by weight |
| Lecithin | 0.1 parts by weight |
| Water | 18.68 parts by weight |
| Cane sugar | 5.0 parts by weight |
| Lactose | 5.0 parts by weight |
| Starch syrup | 20.0 parts by weight |
| Defatted milk powder | 1.0 parts by weight |
| β-carotene | 0.01 parts by weight |
| Flavor | 0.01 parts by weight |

The increased melting points of the above-mentioned mixtures of oil and fat in samples (1), (2) and (3) were

TABLE 2

| | Melting Point (°C.) | Established Tempering Temperature (°C.) | Difference From Melting Point (°C.) | Cooling Rate (°C.) | Value for Evaluating Tempering (°C./hr.) |
|---|---|---|---|---|---|
| Example 2 | 33.7 | 32 | −1.7 | 0.4 | 104 |
| Comp. Ex. 3 (Mixture) | | | | | |
| 1st stack (Temp. 32.2° C.) | 33.7 | | −1.5 | 0.4 | 96 |
| 3rd stack (Temp. 31.3° C.) | 33.7 | | −2.4 | 0.3 | 88 |
| 5th stack (Temp. 31.7° C.) | 33.7 | | −2.0 | 0.3 | 92 |
| (Side) | | | | | |
| 2nd stack (Temp. 33.2° C.) | 33.7 | | | 1.3 | 106 |
| 4th stack (Temp. 33.0° C.) | 33.7 | | | 1.5 | 100 |
| (Center) | | | | | |
| 2nd stack (Temp. 28.6° C.) | 33.7 | | | 0.3 | 87 |
| 4th stack (Temp. 28.3° C.) | 33.7 | | | 0.2 | 79 |

33.8° C., 33.5° C. and 34.1.° C., respectively. From these three samples, there was produced the sugar-added margarine according to the present invention in the same manner as in Example 1. The tempering method and the tempering temperature were also the same as in Example 1. The margarine thus produced was packed in the same package style as in Example 1, after which it was immediately transferred to an isothermal chamber maintained at 10° C. After verification of the temperature having reached 10° C., the margarine was whipped in the same manner as in Example 1. The results obtained from this whipping are shown in Table 3.

TABLE 3

| Sample No. | Melting point of oil & fat (°C.) | Established tempering temperature (°C.) | Difference from melting point (°C.) | Cooling rate (°C./hr) | Value for evaluating tempering |
|---|---|---|---|---|---|
| (1) | 33.8 | 32 | −1.8 | 1.4 | 98 |
| (2) | 33.5 | 32 | −1.5 | 1.3 | 100 |
| (3) | 34.1 | 32 | −2.1 | 1.4 | 96 |

From Table 3, it can be seen that, in either case, the product obtained in accordance with the present invention possesses its stabilized whipping property.

As has been explained in the foregoing, the method for producing sugar-added margarine according to the present invention comprises uniformly heating an emulsion containing therein 5 to 50% by weight of sugar calculated in terms of the anhydride to a pre-established optimum tempering temperature which is higher than a temperature lower by 10° C. than its melting point, with a precision of ±2° C.; and thereafter cooling the thus tempered emulsion at a cooling rate of 5° C./hr. The effect of this method is that the heating time for tempering can be shortened to about a few minutes, which used to be 24 to 72 hours in a conventional tempering chamber method and that the tempering treatment can be conducted continuously without necessity for a large tempering space. Further, as compared with the sugar-added margarine obtained by a conventional method, the sugar-added margarine obtained by the method of the present invention shows its excellent creaming property when it is used at a dining table or for confection and bread-baking. Also, when it is used for whipping, it exhibits remarkable whipping property and shape-retaining property. Furthermore, when it is used as a filling material, it exhibits excellent deposition property. Thus, the sugar-added margarine manufactured by the method according to the present invention can be a stabilized and uniform product. The method contributes to stabilization and rationalization of manufacturing process.

We claim:

1. A method of manufacturing sugar-added margarine containing 5–50% by weight of sugar as an anhydride thereof, which comprises:
   (a) uniformly heating a margarine formed from an emulsion of oil, fat and said sugar by means of a microwave heating device at a temperature sufficient to temper said emulsion, and which tempering temperature is higher than 10° C. below the melting point of said oil and fat in said emulsion, with a precision of ±2.0° C.; and then
   (B) Cooling said emulsion at a rate of not higher than 5° C./Hr.

2. The method for manufacturing sugar-added margarine according to claim 1, wherein said margarine contains 10 to 35% by weight of sugar, calculated as the anhydride.

3. The method for manufacturing sugar-added margarine according to claim 1, wherein said sugar is selected from the group consisting of cane sugar, glucose, fructose, lactose, maltose, starch sugar, molasses, syrup, malt reducing sugar and isomerized sugar.

4. The method for manufacturing sugar-added margarine according to claim 1, wherein said oil and fat is selected from the group consisting of a refined animal or vegetable oil and fat, hardened or fractional oils and fats thereof, and a transesterified oil.

5. The method for manufacturing sugar-added margarine according to claim 4, wherein said oil is selected from the group consisting of rape seed oil, corn (kernel) oil, soy bean oil, palm (kernel) oil, cottonseed oil, coconut oil and safflower oil.

6. The method for manufacturing sugar-added margarine according to claim 4, wherein said fat is selected from the group consisting of milk fat, beef tallow, and lard.

7. The method of manufacturing sugar-added margarine according to claim 1, wherein said oil and fat is present in an amount of 30 to 90% by wt.

8. The method for manufacturing sugar-added margarine according to claim 1, wherein said emulsion of oil, fat and sugar is emulsified by an emulsifier selected from the group consistion of lecithin, sorbitan fatty acid ester, cane sugar fatty acid ester, glycerine fatty acid ester, propylene gylcol fatty acid ester and polyglycerine fatty acid ester; in an amount of about 0.1 to 5% relative to the oil and fat used.

9. The method for manufacturing sugar-added margarine according to claim 1, wherein said emulsion is heated to a temperature of about 80° C. or above, and thereafter the temperature is lowered to about 55° C. to 65° C.

10. The method for manufacturing sugar-added margarine according to claim 1, wherein said uniform heating is conducted such that a precision of ±1° C. is maintained.

11. The method for manufacturing sugar-added margarine according to claim 1, wherein said micro-wave heating is effected at a frequency of 2,450 MHz/sec.

12. The method for manufacturing sugar-added margarine according to claim 1, wherein said tempering temperature is established in accordance with the SFC approximation method which comprises:
   (a) measuring the solid fat content of one oil and fat or a mixture of two oils and fats by the SFC approximation method at different temperature levels;
   (b) plotting SFC curves on the basis of the values obtained and the melting point of the oil and fat or the increased melting point of the mixture of the oils and fats; and
   (c) determining, from the SFC curves, a temperature at which the solid fat content has a value of from 6 to 8.

* * * * *